(12) United States Patent
Commo et al.

(10) Patent No.: US 9,354,134 B2
(45) Date of Patent: May 31, 2016

(54) IN-SITU LOAD SYSTEM FOR CALIBRATING AND VALIDATING AERODYNAMIC PROPERTIES OF SCALED AIRCRAFT IN GROUND-BASED AEROSPACE TESTING APPLICATIONS

(71) Applicant: U.S.A. as represented by the Administrator of the National Aeronautics and Space Administration, Washington, DC (US)

(72) Inventors: Sean A. Commo, Newport News, VA (US); Keith C. Lynn, Newport News, VA (US); Drew Landman, Norfolk, VA (US); Michael J. Acheson, Norfolk, VA (US)

(73) Assignee: THE UNITED STATES OF AMERICA AS REPRESENTED BY THE ADMINISTRATOR OF THE NATIONAL AERONAUTICS AND SPACE ADMINSTRATION, Washington, DC (US)

( * ) Notice: Subject to any disclaimer, the term of this patent is extended or adjusted under 35 U.S.C. 154(b) by 283 days.

(21) Appl. No.: 14/191,898

(22) Filed: Feb. 27, 2014

(65) Prior Publication Data

US 2016/0011068 A1  Jan. 14, 2016

Related U.S. Application Data

(60) Provisional application No. 61/774,873, filed on Mar. 8, 2013.

(51) Int. Cl.
*G01L 25/00* (2006.01)

(52) U.S. Cl.
CPC .................................. *G01L 25/00* (2013.01)

(58) Field of Classification Search
CPC ............................. G01L 25/00; G01L 25/003
USPC .................................................. 73/1.08, 1.15
See application file for complete search history.

(56) References Cited

U.S. PATENT DOCUMENTS

| 3,019,643 | A | 2/1959 | Curry |
| 5,279,144 | A * | 1/1994 | Levkowitch ........... G01G 23/01 |
| | | | 16/367 |
| 5,663,497 | A | 9/1997 | Mole |
| 6,629,446 | B2 * | 10/2003 | Parker ................ G01G 23/3728 |
| | | | 73/1.15 |

(Continued)

OTHER PUBLICATIONS

"Recommended Practice: Calibration and Use of internal Strain-Gage Balances with Application to Wind Tunnel Testing," 2003, AIAA R-091-2003, pp. 1-74.

(Continued)

*Primary Examiner* — Peter Macchiarolo
*Assistant Examiner* — Nathaniel Kolb
(74) *Attorney, Agent, or Firm* — Andrea Z. Warmbier

(57) ABSTRACT

An In-Situ Load System for calibrating and validating aerodynamic properties of scaled aircraft in ground-based aerospace testing applications includes an assembly having upper and lower components that are pivotably interconnected. A test weight can be connected to the lower component to apply a known force to a force balance. The orientation of the force balance can be varied, and the measured forces from the force balance can be compared to applied loads at various orientations to thereby develop calibration factors.

18 Claims, 7 Drawing Sheets

(56) References Cited

U.S. PATENT DOCUMENTS 9,052,250 B1 6/2015 Parker et al.
2002/0088268 A1* 7/2002 Parker ............... G01G 23/3728
73/1.15

OTHER PUBLICATIONS

Lynn, K. C. et al., "High-Reynolds Number Active Blowing Semi-Span Force Measurement System Development" 8th International Symposium on Strain-Gauge Balances, May 2012, pp. 1-31.

Johnson, T. H. et al., "Calibration Modeling of Nonmonolithic Wind-Tunnel Force Balances," Journal of Aircraft, Nov.-Dec. 2010, pp. 1860-1866. vol. 47. No. 6.

Montgomery, D. C., "Design and Analysis of Experiments," 2009, pp. 12-13 and pp. 222, 7th ed., John Wiley & Sons, New York.

Delroach, R., "Check-Standard Testing Across Multiple Transonic Wind Tunnels with the Modern Design of Experiments," AIAA, 28th Aerodynamic Measurement Technology, Ground Testing, and Flight Testing Conference, Jun. 2012, pp. 1-25, New Orleans, Louisiana.

Lynn, KC. et al., "Wind-Tunnel Balance Characterization for Hypersonic Research Applications," Journal of Aircraft, Mar.-Apr. 2012, pp. 556-565, vol. 49, No. 2.

Guarino, J., "Calibration and Evaluation of Multi-Component Strain-Gage Balances," NASA Interlaboratory Force Measurements Group Meeting, Apr. 1964, pp. 1-23, Pasadena, CA.

Myers, R. H., "Classical and Modern Regression with Applications," 1990, pp. 41-47 and pp. 112, 2nd ed., Duxberry Press, Belmont, CA.

Parker, P. A. et al., "A Single-Vector Force Calibration Method Featuring the Modem Design of Experiments," 39th AIAA Aerospace Sciences Meeting and Exhibit. Jan. 2001, pp. 1-28.

Beer, Ferdinand P. et al., "Vector Mechanics for Engineers: Statics," 2004, pp. 81 and 93, 7th Edition, McGraw-Hill Publication.

Parker, P. A. et al., "Advancements in Aircraft Model Force and Attitude Instrumentation by Integrating Statistical Methods," Journal of Aircraft, Mar.-Apr. 2007, pp. 436-443, vol. 44, No. 2.

Ulbrich, N., "A Universal Tare Load Prediction Algorithm for Strain-Gage Balance Calibration Data Analysis," 47th AIAA/ASME/SAE/ASEE Joint Propulsion Conference and Exhibit, Jul. 31-Aug. 3, 2011, pp, 1-19.

Myers, Raymond H. et al., "Response Surface Methodology Process and Product Optimization Using Designed Experiments," 2002, pp. 303-304, 2nd ed., John Wiley & Sons Publication.

* cited by examiner

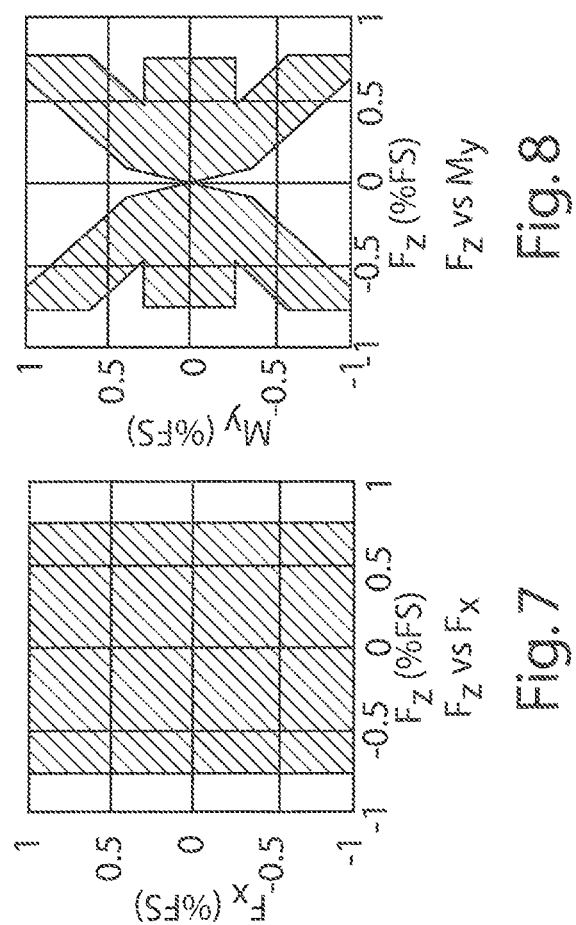

IN-SITU LOAD SYSTEM FOR CALIBRATING AND VALIDATING AERODYNAMIC PROPERTIES OF SCALED AIRCRAFT IN GROUND-BASED AEROSPACE TESTING APPLICATIONS

CROSS-REFERENCE TO RELATED APPLICATION

This application claims the benefit of U.S. Provisional Application No. 61/774,873 titled "IN-SITU LOAD SYSTEM FOR CALIBRATING AND VALIDATING AERODYNAMIC PROPERTIES OF SCALED AIRCRAFT IN GROUND-BASED AEROPACE TESTING APPLICATIONS" filed on Mar. 8, 2013, the entire contents of which are incorporated by reference.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

BACKGROUND OF THE INVENTION

Wind-tunnel balances are multi-dimensional force transducers used to obtain high-precision measurements of the aerodynamic loads on an aircraft model during wind-tunnel testing. In many wind tunnels, these aerodynamic measurements are made with the measurement device installed inside of the aircraft model, also known as an internal balance. Internal balances are electro-mechanical devices designed to isolate the aerodynamic load components on to a series of structural springs, or flexural elements. Strain-gage bridges are commonly used to measure strain induced in the flexure as a result of deflection. In theory, the flexure deflections and the resulting induced strain are proportional to the imparted load. Six-component internal balances are mechanically designed and instrumented with strain-gage bridges in one of the three following configurations:

Direct-Read (NF, PM, SF, YM, RM, AF)
Force (N1, N2, S1, S2, RM, AF)
Moment (PM1, PM2, YM1, YM2, RM, AF)

The three types of internal balances measure rolling moment and axial force directly; however, the remaining four aerodynamic components are either measured directly, as in the case of direct-read, or are computed by combining sets of strain-gage bridges (i.e. for a force balance, NF=N1+N2 and PM=N1−N2). The type of internal balance impacts both the calibration and its use.

With reference to FIG. 1, a known internal force balance 20 has two attachment points. The non-metric end 22 of the balance 20 is grounded to the wind-tunnel model support system or model sting 38. The non-metric end 22 of the balance 20 does not contribute to the sensed force by the force balance 20. On the opposite end of the balance 20 is the metric end 24, which attaches to the wind-tunnel aircraft model 25. The metric end 24 is where the aerodynamic loads are transferred into the main body of the balance 20 and the flexure beams. In addition to the force balance 20, an angle measurement system (AMS) may be installed inside of the aircraft model 25 for measuring model orientation. Together, the aircraft model 25, model sting, force balance 20, AMS, and other instrumentation comprise a wind-tunnel model system (WTMS). Traditionally, these components are considered to be independent systems with little to no interaction effects.

A known approach involves characterizing the measurement systems independently and then the individual components are integrated prior to a test. Under the assumption of no interaction between the components of the WTMS, this approach is sufficient. It is known that interactions can exist between the components and therefore a methodology to understand these effects would be beneficial. A known method for assessing balance performance or WTMS interactions is known as check-loading. Check-loading includes applying a precision load using free-hanging deadweights, hydraulics, or a pneumatic system. Generally speaking, check-loading is currently used prior to a wind-tunnel test to ensure proper installation and integration of the WTMS components, and to validate that the balance is performing as expected. The latter requires knowledge of the calibration of a balance. As the primary source for aerodynamic force and moment data, balance calibrations play a critical role in the quality of the data collected during a wind-tunnel test; yet, the performance of a balance cannot be characterized in-situ while fully integrated in the WTMS. Furthermore, since there are few recommendations available, the process of check-loading may vary from wind tunnel to wind tunnel. This variability between facilities in combination with limited resources, such as traceable standards and required hardware, previously prohibited a robust system-level, in-situ characterization or validation of the WTMS.

Although the process of check-loading is not standardized, many facilities use simple mechanical hardware, similar to what is used in conventional calibrations, to apply a single- or two-component load to the balance or WTMS. More complex loadings are difficult to set-up and execute in a wind tunnel and may introduce more uncertainty than they quantify. Axial force check-loads may be difficult to apply because applying these loads requires a pulley and cable setup. This type of setup increases the odds that additional uncertainties will be introduced. In aeronautics research, axial force check-loads provide valuable information concerning the performance of a balance. However, these loads cannot be applied consistently and confidently utilizing conventional methods.

The AIAA paper "Recommended Practice: Calibration and Use of Internal Strain Gage Balances with Application to Wind Tunnel Testing," Tech. Rep. R-091-2003, AIAA, 2003, briefly discusses the role of check-loads. The document suggests that check-loads are used to verify the scale factor of the gage bridges between two different environments, such as the calibration laboratory versus the wind-tunnel test section. Furthermore, it recommends that check-loads should be applied at the facility using the same hardware used during the calibration. The document does not address any standard procedures to be used during 9 balance check-loading, or any standard metrics that shall be used by the test engineer or researcher to evaluate the overall performance of the balance in the testing environment.

SUMMARY OF THE INVENTION

One aspect of the present invention is an In-Situ Load System (ILS) that addresses the issues noted above. The ILS includes both physical hardware and a methodology that standardizes the check-loading process. The system-level capabilities minimize measurement uncertainties in the data collected during a wind-tunnel test. Furthermore, the ILS of the present invention is compact and simple. The ILS may be utilized in connection with internal balances or external semi-span type balances.

One aspect of the present invention is an on-site method of calibrating a force balance in the presence of a gravitational field defining a gravity vector. The method includes providing a force balance defining a force balance coordinate system. The force balance is configured to measure applied roll, pitch, and yaw moments, and axial, side, and normal forces. The method includes connecting the force balance to a movable support that is capable of rotating the force balance in at least pitch and roll. An angle measurement system is utilized to measure an angular orientation of the force balance relative to the gravity vector. A pivotable connecting assembly is also provided. The pivotable connecting assembly has an upper mounting structure that is operably connected to the force balance such that forces applied to the upper mounting structure are transmitted to the force balance. The upper mounting structure is pivotably connected to a lower mounting structure by a bearing assembly that permits rotation of the lower mounting structure relative to the upper mounting structure in at least two degrees of freedom such as pitch and roll. A test force is applied to the lower mounting structure. The test force may be applied utilizing a test weight that is operably connected to the lower mounting structure to thereby apply a known test force to the force balance. The test weight may be operably connected to the lower mounting structure utilizing a test fixture or an aerodynamic model that is to be tested in the wind tunnel. Force measurements of the force balance are compared to a test force applied to the force balance at a first angular orientation of the force balance relative to the gravity vector. The force balance is then rotated to a second angular orientation relative to the gravity vector. Force measurements of the force balance are compared to a test force applied to the force balance at the second angular position relative to the gravity vector. The test force provides known loads having one or more vector components in a coordinate system of the force balance that can be compared to measured force vector components from the force balance to develop calibration factors that can be utilized during aerodynamic testing to obtain accurate measurements of the aerodynamic forces according to predefined statistical criteria.

Another aspect of the present invention is a method of calibrating a force balance in a wind tunnel. The method includes connecting a force balance to a movable support member in a wind tunnel. A pivoting connecting assembly having at least two rotational degrees of freedom is utilized to apply a test force to the force balance in a known direction. The test force may be applied by connecting a test weight to the force balance. A first force measurement from the force balance is obtained when a known test force is applied to the force balance with the force balance in a first orientation. A second force measurement from the force balance is obtained when a known test force is applied to the force balance when the force balance is in a second orientation wherein the force balance is rotated relative to the first orientation. The orientations of the force balance may be obtained by utilizing an angle measurement system that is mounted to the force balance or a rigid structure that is fixed to the force balance. Calibration factors are generated by comparing the first and second force measurements to the known test force to determine differences between the first and second force measurements and the known test force whereby the calibration factors can be utilized to measure applied loads during aerodynamic testing in a wind tunnel.

Another aspect of the present invention is a system for calibrating a force balance in the presence of a gravitational field defining a gravity vector. The system includes a force balance configured to measure loads including axial force, normal force, side force, pitching moment, rolling moment, and yawing moment in a coordinate system defined by the force balance. The system also includes a test structure connected to the force balance such that loads applied to the test structure can be measured by the force balance. The system further includes a load bearing assembly including an upper mounting structure secured to the test structure, and a lower mounting structure that is pivotably connected to the upper mounting structure and pivots relative to the upper mounting structure in at least pitch and roll. The lower mounting structure includes a connector configured to support a test weight to thereby apply a known force to the force balance in the direction of the gravity vector. The system further includes an angle measurement system that provides gravitation vector components in the coordinate system of the force balance whereby at least one of the measured loads can be compared to a known applied load. The test structure may comprise an aerodynamic model, or it may comprise a calibration fixture.

These and other features, advantages, and objects of the present invention will be further understood and appreciated by those skilled in the art by reference to the following specification, claims, and appended drawings.

BRIEF DESCRIPTION OF THE DRAWINGS

FIG. 7 is a graph showing an applied load space ($F_Z$ vs. $F_X$) for the In-Situ Load System (ILS); and FIG. 8 is a graph showing an applied load space ($F_z$ vs. $M_y$) for the In-Situ Load System (ILS).

DETAILED DESCRIPTION

Figure 2:
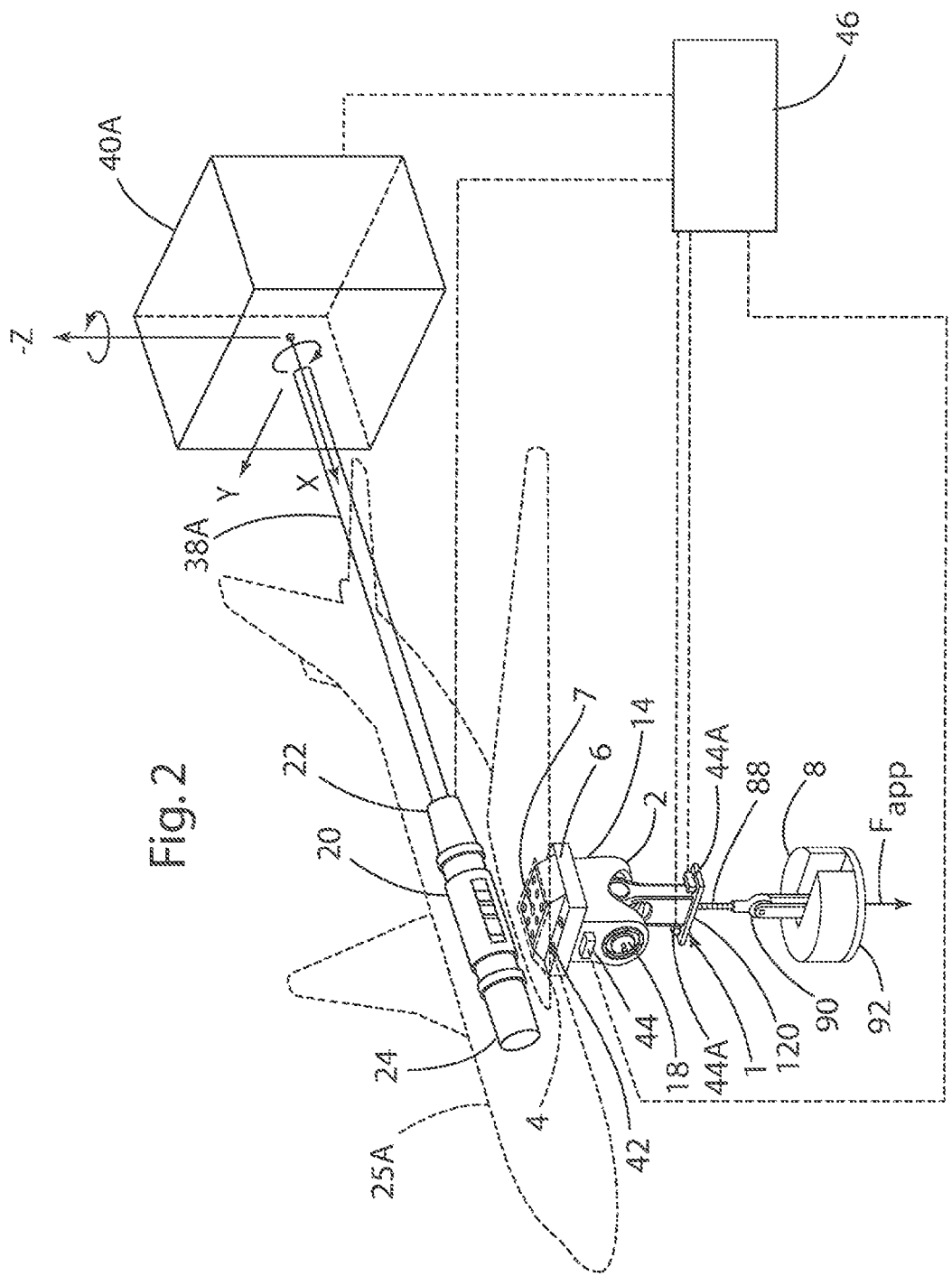
FIG. 2 is a partially schematic isometric view of an In-Situ Load System (ILS) and aerodynamic model according to one aspect of the present invention.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
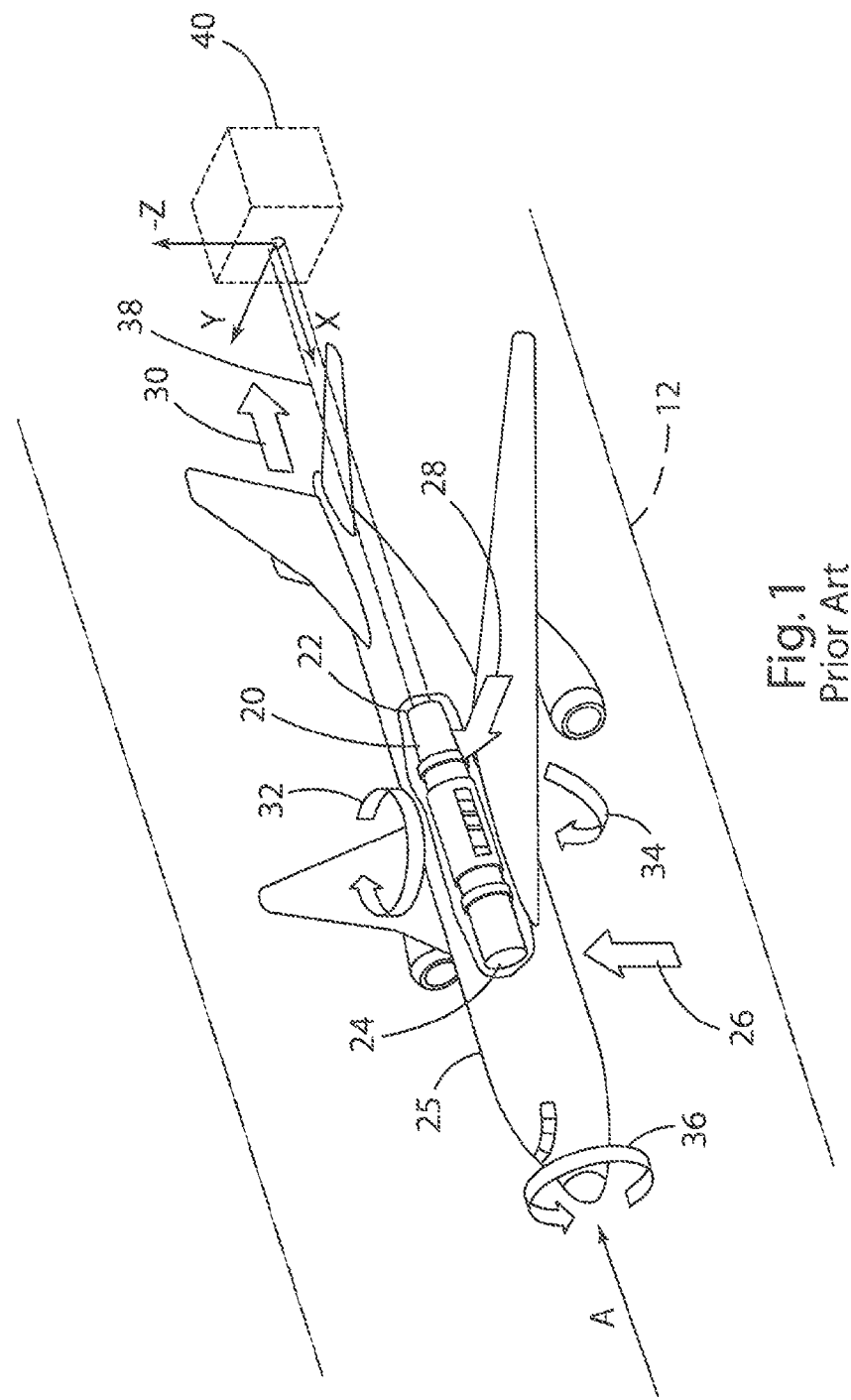
FIG. 1 is a partially schematic isometric view of a known aerodynamic model and force balance in a wind tunnel.

Referring again to FIG. 1, in a typical known wind tunnel test, wind tunnel aerodynamic loads acting on model 25 include a normal (lift) force 26, a side force 28, and an axial (drag) force 30. The aerodynamic loads also include a yaw moment 32, a pitch moment 34, and a roll moment 36. The nonmetric end 22 of force balance 20 may be rigidly interconnected to an elongated support structure such as a rod 38 that is movably mounted to a base 40. The elongated rod 38 may be substantially aligned with the forces 30 acting in an axial direction. Base 40 may include powered actuators such that the elongated rod 38 may be rotated about the x, y, and z axes to change the orientation of model 25 relative to the direction of the air flow "A". The model 25, base 40, and other components may be located inside an elongated passageway 12 of the wind tunnel.

With further reference to FIG. 2, an In-Situ Load System (ILS) 1 of the present invention may include a connecting assembly 2 that is secured to a pad 4 of an aerodynamic model 25A. As discussed in more detail below, connecting assembly 2 includes a ILS mount 6 having one or more openings 7 or other connectors for connecting the ILS mount 6 to pad 4 of aerodynamic model 25A. The aerodynamic model 25A may be similar to known aerodynamic models 25 (FIG. 1), except that aerodynamic model 25A includes a pad 4 that can be used to rigidly interconnect model 25A to ILS mount 6 of connecting assembly 2. Connecting assembly 2 further includes an upper bearing mount 14 that is rigidly connected to ILS mount 6 by threaded fasteners 42. As discussed in more detail below in connection with FIG. 4, connecting assembly 2 also includes a lower bearing mount 16 that is pivotally connected to upper bearing mount 14 by a bearing or connecting assembly 18 that provides at least two rotational degrees of freedom to thereby permit the lower bearing mount 16 to rotate relative to upper bearing mount 14. A test weight 8 can be connected to the lower bearing mount 16 to thereby generate a test force $F_{app}$ acting in the direction of the gravity vector. It will be understood that a test force may be generated utilizing a powered actuator such as a hydraulic cylinder or other suitable device providing a known force in a known direction. Because the lower bearing mount 16 pivots freely relative to upper bearing mount 14, the test force $F_{app}$ is always parallel to the gravitational vector (provided the physical limits of connected assembly 2 are not exceeded).

A first angle measurement system 44 can be attached to the upper bearing mount 14, and a second angle measurement system 44A can be attached to lower bearing mount 16 utilizing a plate 120. As discussed in more detail below, the angle measurement systems 44 and 44A may comprise known sensors that include 3 accelerometers that measure the gravitational force such that the orientation of the angle measurement systems 44 and 44A relative to a gravity vector defined by the earth's gravitational field can be determined. The force balance 20, angle measurement systems 44 and 44A, and base 40 may be operably connected to a data collection and processing system 46. It will be understood that the system 46 may include a number of computers, controllers, display screens, and other devices as required for a particular application. Also, it will be understood that the base 40 may comprise a known device of the type utilized in wind tunnels to movably support aerodynamic models during testing. The configuration of the base 40 may therefore vary depending on the particular wind tunnel facility and/or test to be conducted.

Figure 3:
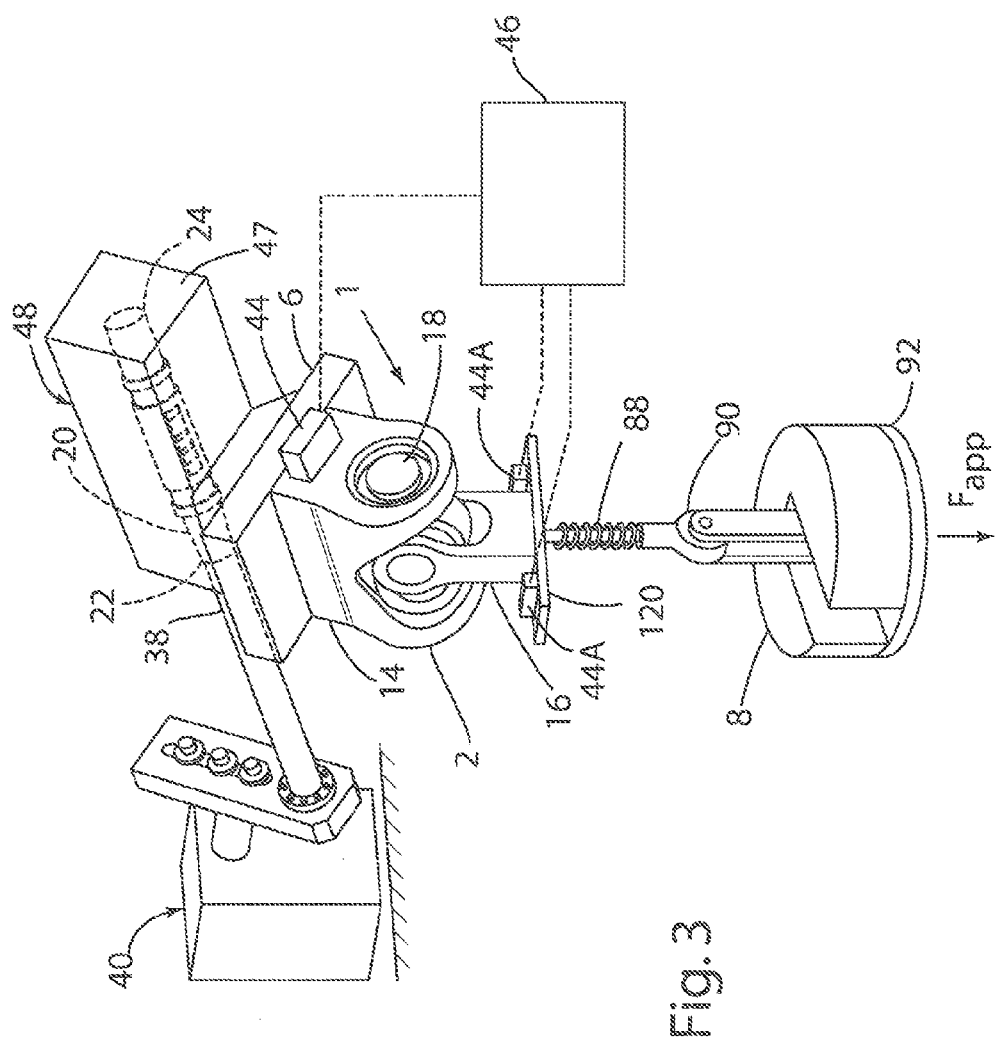
FIG. 3 is a partially schematic isometric view of an in-Situ Load System (ILS) and test fixture according to one aspect of the present invention.

As discussed above, the ILS 1 may be connected to an aerodynamic model 25A. Alternatively, ILS 1 may be connected to a calibration fixture 48 as shown in FIG. 3. The calibration fixture 48 may comprise a known unit of the type previously utilized to calibrate force balances 20 in a calibration laboratory. As shown in FIG. 3, the nonmetric end 22 of force balance 20 may be connected to an elongated support member 38A of a base 40A, and calibration fixture 48 may be secured to metric end 24 of force balance 20. The connecting assembly 2 is then rigidly connected to the calibration fixture 48 utilizing ILS mount 6 and threaded fasteners (not shown) or other suitable connecting arrangement. A first angle measurement system 44 may be rigidly mounted to the upper bearing mount 14 of connecting assembly 2, and a second angle measurement system 44A may be rigidly mounted to lower bearing mount 16. A test weight 8 is secured/mounted to the lower bearing mount 16. Test weight 8 generates an applied force $F_{app}$ that is coincident with a gravity vector defined by the earth's gravitational field. A hydraulic cylinder or other powered actuator may also be utilized to apply a test force.

As discussed in more detail below, the magnitude of the applied force $F_{app}$ is known within a high degree of accuracy, and the direction of the applied force $F_{app}$ is also known. The angle measurement system 44 provides a precise measurement concerning the angular orientation of force balance 20, and second angle measurement system 44A precisely measures the angular orientation of lower bearing mount 16. It will be understood that second angle measurement system 44A may not be required in every case. For example, it can be assumed that lower bearing mount 16 will always have a certain orientation relative to the gravity vector. Although this assumption may not be correct due to friction in bearing assembly 18 and other factors, such an assumption may provide sufficient accuracy in some cases.

During calibration of force balance 20, base 40 (or 40A) can be utilized to change the angular orientation of force balance 20 by rotating the support member 38 (or 38A) about one or more axes. Differences between the measured forces generated by force balance 20 and the applied forces can be determined at various angular orientations of force balance 20, and these differences can be utilized to generate calibration factors. During aerodynamic testing of aerodynamic model 25, 25A, etc., the In-Situ Load System (ILS) 1 is detached, and the calibration factors can be utilized to provide an accurate measurement of forces 26, 28, 30 and moments 32, 34, 36 (FIG. 1) resulting from the aerodynamic characteristics of the model.

Figure 4:
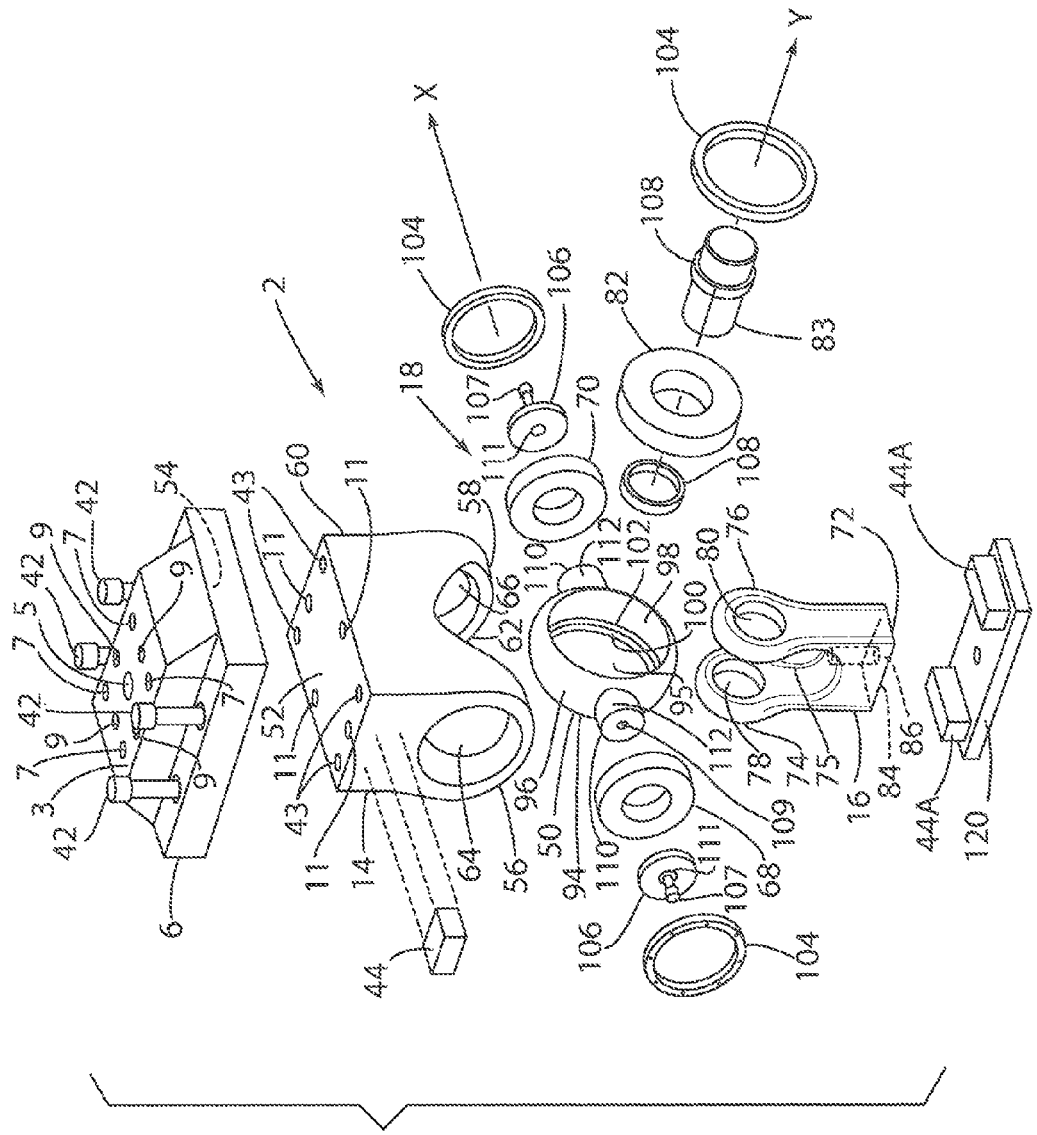
FIG. 4 is an exploded isometric view of an In-Situ Load System (ILS) according to one aspect of the present invention.

With further reference to FIG. 4, the connecting assembly 2 includes an upper mounting structure such as upper bearing mount 14, and a lower mounting structure such as lower bearing mount 16. When assembled (FIG. 5), the upper and lower bearing mounts 14 and 16, respectively, are rotatably connected by bearing assembly 18 to permit rotation of lower bearing mount 16 relative to upper bearing mount 14 about orthogonal axes X and Y.

Upper bearing mount 14 includes a flat upper surface 52 that fits closely against a flat lower surface 54 of ILS mount 6 when assembled. Threaded fasteners 42 are received in threaded openings 43 of upper bearing mount 14 to rigidly interconnect the ILS mount 6 and upper bearing mount 14. A plurality of openings 11 in upper bearing mount 14 and corresponding openings (not shown) in ILS mount 6 receive dowels or pins 13 (FIG. 5) to precisely position upper bearing mount 14 relative to the ILS mount 6. ILS mount 6 includes a plurality of openings 7 and 9 in top surface 3 of ILS mount 6 that receive threaded fasteners or the like (not shown) to secure the ILS mount 6 to pad 4 (FIG. 2) of an aerodynamic model 25A, or to a calibration fixture 48 (FIG. 3). A plurality of openings 9 in ILS mount 6 may receive dowels or other pins (not shown) to thereby precisely position the ILS mount 6 relative to the pad 4 of an aerodynamic model 25A or to a calibration fixture 48. It will be understood that various mounting hardware and configurations may be utilized to rigidly interconnect the connecting assembly 2 to pad 4 of an aerodynamic model 25A or to a calibration fixture 48.

The dimensions of the components 6, 14, 16, etc. of ILS 1 are precisely controlled such that the location of the applied force $F_{app}$ relative to force balance 20 can be determined as the model 25A or test fixture 48 is rotated. Also, as discussed in more detail below, the weights of the components of ILS 1 and the locations of the centers of gravity of the components of ILS 1 are also measured/known, such that the input loads to force balance 20 resulting from these components can be taken into account in determining the total force that is applied to force balance 20 during calibration.

Figure 5:
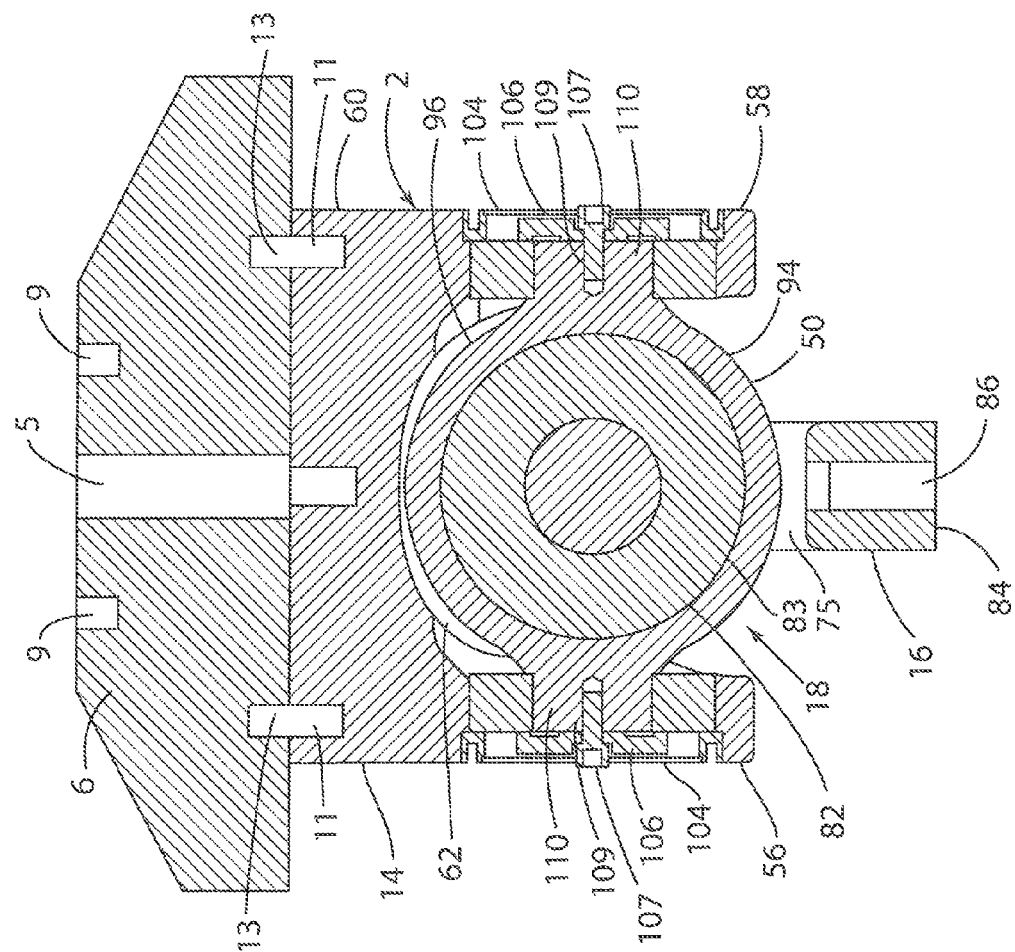
FIG. 5 is a cross sectional view of the In-Situ Load System (ILS) of FIG. 4 when assembled.

Referring again to FIG. 4, upper bearing mount 14 includes a base portion 60 and first and second structures or portions 56 and 58 that extend downwardly from base portion 60. The downwardly extending portions 56 and 58 include openings 64 and 66 that receive bearings 68 and 70 when assembled. The central portion 62 of upper bearing mount 14 is hollow to provide clearance for bearing cross 50 when assembled (FIG. 5).

Lower bearing mount 16 includes a base portion 72 with support portions or structures 74 and 76 that extend from the base portion 72. When assembled, openings 76 and 78 in portions 74 and 76, respectively, receive a pin 83 to thereby rotatably interconnect the lower bearing mount 16 to a bearing 82. When assembled, the bearing 82 is disposed in open area 75 between the portions 74 and 76. A threaded opening 86 in lower side surface 84 of lower bearing mount 16 threadably receives a threaded rod 88 (FIGS. 2 and 3) of a support assembly 90 that is utilized to support a test weight 8. The test weights 8 may be in the form of plates, discs, or the like that are supported on a flat shelf member 92 of support assembly 90.

Referring again to FIG. 4, bearing cross 50 comprises a ring structure 94 having a curved outer surface 96 and a central opening 95. Cylindrical surfaces 98 and 100 extend around opening 95. The cylindrical surface 100 has a somewhat smaller diameter than the cylindrical surface 98, and a step or transverse surface 102 extends between the cylindrical surfaces 98 and 100. When assembled, the bearing 82 abuts the transverse surface 102 to thereby position the bearing 82 at the center of ring structure 94 of bearing cross 50. A retainer such as a bearing nut 104 may be utilized to retain the bearing 82 in the bearing cross 50, and spacers 108 may be utilized to position the bearing 82 as may be required.

Bearing cross 50 also includes bosses or extensions 110 that protrude outwardly in opposite directions from outer surface 96. The extensions 110 include cylindrical outer surfaces 112 that are received in bearings 68 and 70 when connecting assembly 2 is assembled. The bearings 68 and 70 may be positioned and retained by retaining caps 106 and bearing nuts 104. Threaded fasteners 107 may extend through openings 111 in retaining caps 106. Threaded fasteners 107 engage threaded openings 109 in extensions 110 of bearing cross 50 (see also FIG. 5). The bearings 68, 70, and 82 may comprise ball bearings having low friction and high tolerances to ensure that the lower bearing mount 16 can rotate relative to upper bearing mount 14 without translating (i.e. without "slop") and without generating moments that could otherwise result if significant rotational resistance were present.

The accuracy of the data acquired during a wind-tunnel test is directly related the mechanical and electrical condition of a balance and the quality of a balance calibration. Typically, balance calibrations are performed in a laboratory environment where effects such as temperature, electrical noise, or vibration, are monitored and controlled within acceptable limits to ensure high-quality calibrations. For strain-gage balances, calibration is the process of estimating the mathematical relationship between an applied load and the electrical response of a strain-gage bridge. During a calibration, a load is applied to the balance 20 and the electrical response of the bridges are measured. The form of the mathematical model is largely a function of the type of balance and the assumed physical behavior of balance type. For instance, the mathematical model of a typical six component, single-piece balance is given by $$\sum_{k=1}^{6} rF_k = \beta_0 + \sum_{i=1}^{6} \beta_i F_i + \sum_{i=1}^{5} \sum_{j=i+1}^{6} \beta_{ij} F_i F_j + \sum_{i=1}^{6} \beta_{ii} F_i^2 \quad (1)$$

where the rFs are the electrical response of the strain gage, the $F_s$ are the applied load in six dimensions, and the βs are the regression coefficients that are estimated. This form of the mathematical model is also known as a second-order Taylor-series expansion in six dimensions. The use of these models in balance calibrations is known in the art.

The mathematical models for characterizing the physical behavior of non-single piece balances varies from the model form given in Eq. (1). While the mathematical models for different balance types varies, the use of an ILS 1 according to the present invention in these systems does not change. However, consideration is given to the form of the mathematical model and the physical load constraints. Multi-piece balances, which have a rhombus-type force and moment envelope, typically exhibit different primary sensitivities based on the polarity of the applied load. Because of this behavior, the constraints of the balance and the ILS 1 are factored into the load schedule in order to properly characterize the balance 20. When calibrating a balance, a sufficient number of independent calibration loads should be performed such that all the model terms can be independently estimated. Each term in the mathematical model represents certain physical properties of the force balance. The linear interactions can be attributed to machining errors, errors in both location and alignment of strain gages, and variations in the gage factor for the strain gages. The second-order interaction terms are typically associated with the magnitude of the deflections present in the flexure beams during loading of the balance. Typical balance calibrations have been conducted with only applied loads as being the calibration factors, but it is possible to include additional factors, such as pressure and temperature, within the calibration design if it is suspected that they have an effect on the response(s).

In general, the purpose of check-loads, or validation loads, is to ensure adequate characterization of a balance. Check-loads may be used to verify that a given balance measures a known applied load within the quoted accuracy of the balance. The accuracy of a balance may be defined in terms of the standard deviation of the residual error. A drawback of quoting accuracy as a single number is that it lacks the statistical rigor known about uncertainty intervals in linear regression models.

Performing verification and validation reduces risk by collecting information on the system by means of exercising the system through its full range of capabilities, objectively analyzing the data, and documenting the results. This reduces operational risks and maximizes system performance, while better estimating the system level uncertainties as related to the test objectives. The ILS 1 of the present invention provides a tool that permits more accurate system level validations of Wind Tunnel Model Systems. Although the ILS 1 is configured for system level validations in a wind tunnel facility, the ILS 1 could also be used as a calibration device to calibrate a force balance in a balance calibration lab.

Figure 6:
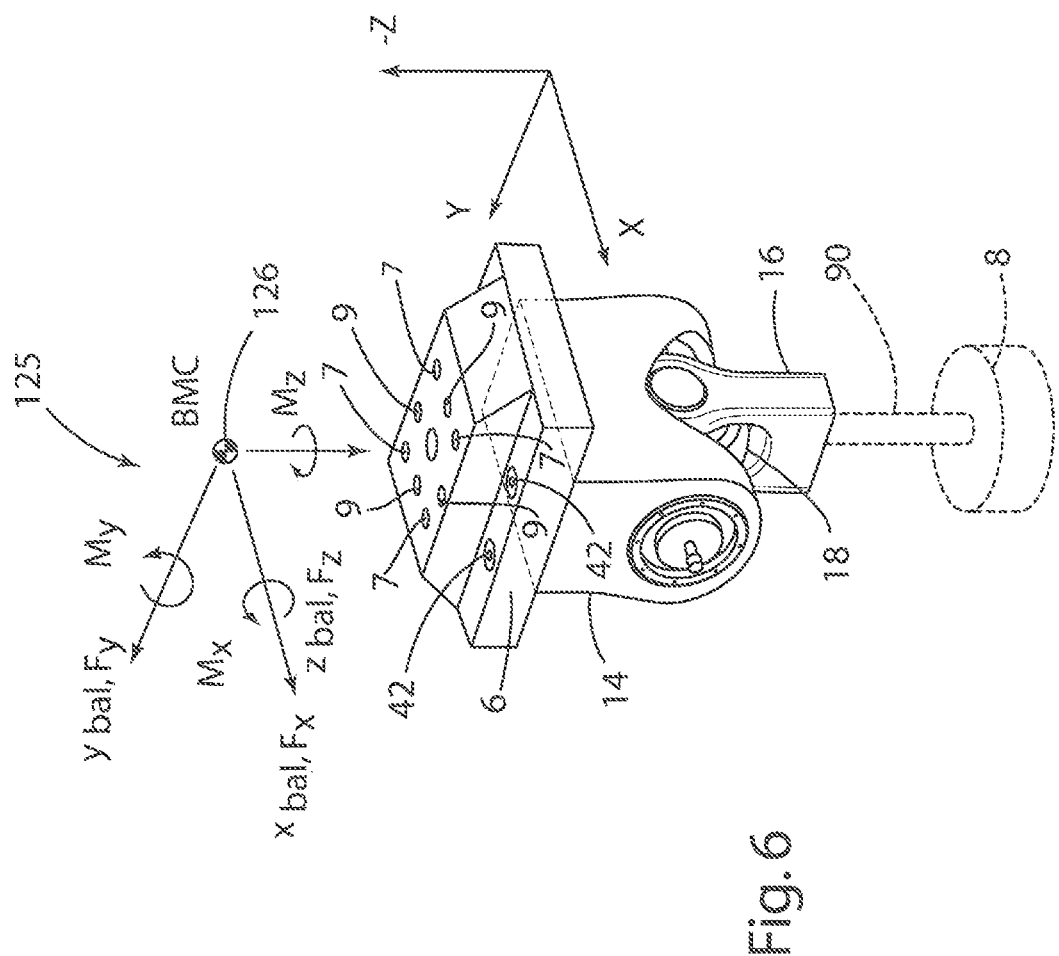
FIG. 6 is an isometric view of an In-Situ Load System (ILS) showing a wind tunnel coordinate system and a force balance coordinate system.

The ILS 1 of the present invention utilizes a single-vector concept to permit in-situ check-loads at a wind tunnel facility. The single-vector concept involves the transformation of a single load vector into a reference balance coordinate system, as shown in FIG. 6. The design of the ILS 1 ensures that the load vector coincides with the gravity vector. Based on the balance coordinate system, the load vector is resolved into the three forces by:

$$F_{bal} = F_{app} g \qquad (2)$$

where $F_{bal}$ is the vector of the three forces defined as $[F_x \; F_y \; F_z]'$, $F_{app}$ is the magnitude of the applied load vector, and g is the gravity vector describing the orientation of the balance expressed as $[g_x \; g_y \; g_z]'$. For a constant $F_{app}$, the magnitude of the three forces is varied by changing the orientation of the balance. The components of the gravity vector are expressed in terms of g's and therefore by definition:

$$|g| = \sqrt{g_z^2 + g_x^2 + g_y^2} = 1. \qquad (3)$$

The moments applied to the force balance 20 are not only a function of the applied load vector and the orientation of the force balance 20 but also the distance of the load point from a reference point. With reference to FIG. 6, for balances, this reference point is known as the balance moment center, and will be referred to herein as BMC 126. The BMC 126 is an imaginary point on the balance 20 that is used to define the balance coordinate frame 125, and is the point by which all forces and moments are referenced.

The distance from BMC 126 is a vector expressed as:

$$d_{BMC} = [x_{BMC} \; y_{BMC} \; z_{BMC}]' \qquad (4)$$

where the sign convention is defined by FIG. 6. The applied moments about BMC 126, $M_{bal}$, are the vector product of the distance vector and the balance force vector, or:

$$M_{bal} = d_{BMC} \times F_{bal} \qquad (5)$$

where $M_{bal}$ is the vector of the three moments defined as $[M_x \; M_y \; M_z]'$ and $F_{bal}$ is given by Eq. 2. The six equations that define the applied forces and moments and the corresponding aerodynamic components are shown in Table 1.

TABLE 1

Equations for Calculating Applied Forces and Moments

| Balance Component | Equation | Corresponding Aerodynamic Component |
|---|---|---|
| $F_x$ | $F_x = F_{app} g_x$ | $AF = -F_x$ |
| $F_y$ | $F_y = F_{app} g_y$ | $SF = F_y$ |
| $F_z$ | $F_z = F_{app} g_z$ | $NF = -F_z$ |
| $M_x$ | $M_x = F_z (y_{BMC}) - F_y (z_{BMC})$ | $RM = M_x$ |
| $M_y$ | $M_y = F_z (x_{BMC}) - F_x (z_{BMC})$ | $PM = M_y$ |
| $M_z$ | $M_z = F_y (x_{BMC}) - F_x (y_{BMC})$ | $YM = M_z$ |

These equations are used to design the combinations in the load schedule for the ILS 1, and are assumed to be the true, applied loads when comparing to the balance estimated (measured) applied loads.

There are physics-based constraints on the combinations of forces and moments that can be independently applied with the ILS 1. In general, there are an infinite number of the six components that can be applied to a force balance with a single load. However, arbitrary combinations of the three forces and three moments are not possible due to the requirement that the resultant force and moment vectors are mutually orthogonal. Mathematically, this is expressed as:

$$F_{bal} \cdot M_{bal} = 0. \qquad (6)$$

Therefore $$(F_x)(M_x) + (F_y)(M_y) + (F_z)(M_z) = 0. \qquad (7)$$

Eq. (7) illustrates the three combinations that cannot be independently applied: $F_x/M_x$, $F_y/M_y$, and $F_z/M_z$. More explicitly, there exists no possible combinations where only $F_x/M_x$, $F_y/M_y$, or $F_z/M_z$ are applied. The ILS 1 has the capability of applying up to five-component loads when mounted at BMC 126 and up to six-component loads when located off of BMC 126. Using Eq. (5) at BMC 126, where the x- and y-distances are zero, the moment about the z-axis is:

$$M_z = F_y(x_{BMC}) - F_x(y_{BMC}) = F_y(0) - F_x(0) = 0. \qquad (8)$$

Hence, the sixth component cannot be applied at BMC 126. Unlike the y-moment arm length, the maximum length of the x-moment arm is determined by the size of the mounting surface. Here, the mounting surface refers to a balance calibration fixture 48 or wind-tunnel aircraft model (e.g. 125, 125A, etc.). For known moderate-capacity force balances 20, the available x-moment arm length is on the order of 2 to 4 inches. The available y-moment arm length is a function of the geometry of the ILS 1.

The ILS 1 can be mounted to a typical balance calibration fixture 48 as shown in FIG. 3. As discussed above, the connecting assembly 2 includes four main components: the mount 6, upper bearing mount 14, bearing cross 50, and lower bearing mount 16. The components may be machined from 15-5 PH stainless steel or other suitable material. The upper bearing mount 14 contains a set of two bearings (68, 70) that provides a first degree of freedom for realignment of the load vector with gravity. The bearing cross 50 contains a second bearing (82) that provides the second required degree of freedom for ensuring the load vector is collinear with gravity. It is assumed that the point of load application is the intersection of the two bearing axes (i.e. axes X and Y, FIG. 4). For both degrees of freedom, there is ±35 degrees of movement available for realignment. The ball bearings 68, 70, and 82 have a maximum load capacity of 5,000 pounds, which limits the magnitude of $F_{app}$. The interface between the ILS mount 6 and the upper bearing mount 14 provides three discrete y-moment arm lengths: −2.25, 0.00, and 2.25 inches. The length of the z-moment arm is fixed at 6.75 inches from the top surface 3 of the ILS mount 6.

Referring to Eq. 2, if the orientation of the force balance 20 with respect to the gravity vector is known, the applied load vector can be resolved into the respective aerodynamic components. FIG. 3 shows an AMS 44 installed on the front 47 of a calibration fixture 48. The AMS package 44 may comprise three quartz-type accelerometers that are oriented orthogonally in three axes. The AMS voltage output and AMS calibration model are used to estimate the gravitational vector components with respect to the balance coordinate system 125.

In general, indirect loads that are sensed by a balance may be removed. Examples of indirect (unintended) applied loads include the weight of the balance itself and the weight of the hardware used to apply a load. Thus, the ILS 1 may introduce an indirect load. Without removing these auxiliary contributors, the load sensed by the force balance 20 is known as the total load. Tare correction is the mathematical process of removing the unintended load from the calculation of the sensed load by the balance. Several methods have been developed for implementing this type of correction. The calculated load after performing this correction is known as the tare-corrected load. During a wind-tunnel test, the aerodynamic force and moment data delivered to researchers is typically tare-corrected. A two-step process may be utilized for performing the tare correction when using the ILS 1 of the present invention. Since the force balance 20 is installed inside of a calibration fixture 48 or aircraft model 25A, the weight of these components is removed using a tare model. The responses in the strain-gage bridges at force balance 20 due to these weights is a function of the orientation of the force balance 20. A linear mathematical model of this relationship is estimated by:

$$\sum_{j=1}^{6} rF_{tare_k} = \gamma_0 + \sum_{i=1}^{3} \gamma_i g_i \quad (9)$$

where the $rF_{tare}$s are the electrical responses of the strain-gage bridges due to the tare load, the gs are the measured components of the gravity vector that define the orientation of the balance 20, and the γs are the model coefficients that are estimated. The coefficients in Eq. (9) are estimated from a standard tare sequence shown in Table 2 (below) with the gravity components expressed in units of g's. The design and execution of the tare sequence is based on response surface methodology principles of randomization, replication, and desired prediction properties of the mathematical model in Eq. (9).

TABLE 2

Tare Sequence for the In-Situ Load System in Standard Order

| Tare Point No. | $g_x$ | $g_y$ | $g_z$ |
|---|---|---|---|
| 1 | −0.191 | −0.694 | 0.694 |
| 2 | −0.191 | 0.000 | 0.982 |
| 3 | −0.191 | 0.694 | 0.694 |
| 4 | 0.000 | −0.707 | 0.707 |
| 5 | 0.000 | 0.000 | 1.000 |
| 6 | 0.000 | 0.000 | 1.000 |
| 7 | 0.000 | 0.000 | 1.000 |
| 8 | 0.000 | 0.000 | 1.000 |
| 9 | 0.000 | 0.707 | 0.707 |
| 10 | 0.191 | −0.694 | 0.694 |
| 11 | 0.191 | 0.000 | 0.982 |
| 12 | 0.191 | 0.694 | 0.694 |

However, the weight of the ILS 1 does not have to be mathematically removed, and it may be included in the calculation of the desired (intended) applied load. This requires precise knowledge of the weight and center of gravity of the components of the ILS 1. Table 3 (below) shows the experimentally-determined weights and three dimensional centers of gravity of the ILS mount 6 and ILS subassembly.

TABLE 3

Mass Properties of the In-Situ Load System

| Component | Weight, lbs. | $CG_x$, in. | $CG_y$, in. | $CG_z$, in. |
|---|---|---|---|---|
| ILS Mount | 27.64 | 0.014 | −0.009 | 4.038 |
| ILS Subassembly | 24.44 | 0.04 | −0.018 | 7.325 |

The ILS Subassembly consists of the upper bearing mount 14 and the bearing cross 50. It is assumed that the force due to the lower bearing mount 16 acts through the load point and therefore the location of the center of gravity is not required. The additional applied force to the balance is the summation of the deadweight load and the weight of the ILS hardware. The applied moments to the balance are calculated by modifying the distance vector, $d_{BMC}$, to include the center of gravity correction, or:

$$d_{BMC} = [x_{BMC} + CG_x, y_{BMC} + CG_y, y_{BMC} + CG_x]' \quad (10)$$

According to a specific example, a known A NTF-113C force balance 20 was utilized to test the ILS 1. The NTF-113C is a monolithic, six-component balance that may be used during full-span testing at a wind tunnel facility. The full-scale design loads for the NTF0113C are shown in Table 4.

TABLE 4

NTF-113C Balance Design Loads

| | | Design Load | |
|---|---|---|---|
| Balance Component | Aerodynamic Component | English Units, lbs or in-lbs | Metric United, N or N-m |
| $F_z$ | NF | 6,520 | 29,002 |
| $F_x$ | AF | 400 | 1,779 |
| $M_y$ | PM | 12,800 | 1,446 |
| $M_x$ | RM | 8,150 | 920 |
| $M_z$ | YM | 6,400 | 723 |
| $F_y$ | SF | 4,000 | 17,792 |

The ratio of maximum applied load with the ILS 1 to the largest capacity force component is:

$$\frac{F_{app}}{F_z} = \frac{5,000}{6,520} = 77\% \ F, S \quad (11)$$

For the remaining five components, applying full-scale loads is possible using the ILS 1. The bridge configuration for the tests is a standard force-balance configuration (NF1/NF2, SF1/SF2, RM, and AF). Under this configuration, the strain-gage bridges are placed at two locations axially along the balance 20. For example, the force in the z-direction, or the normal component of aerodynamic force, is resolved by the summation of the forward and aft normal bridges.

During testing, the NTF-113C force balance was installed inside of a calibration fixture 48 (FIG. 3). The calibration fixture 48 provided the necessary interface for mounting the components of ILS system 1. Three sets of holes were drilled into the calibration fixture 48 for mounting the ILS mount 6 at three locations axially along the length of the balance 20. The three locations established the x-moment arm lengths used in the calculation of the applied moments. Together, the x-, y-, and z-moment arm lengths were combined to create nine load points, as shown in Table 5. The load space defined by the distances from balance moment center is shown in FIGS. 7 and 8 and is expressed in percent full-scale of a component. For wind-tunnel research, the components of highest interest are typically $F_x$, $F_z$, and $M_y$. From FIGS. 7 and 8 it is seen that the full-scale z-component of force cannot be applied due to the 5,000 lbs. static load limit of the bearings. However, it is possible to apply full-scale y-component of force for the entire $F_z$ region. Full-scale moments about the y-axis are possible when Fz is at its maximum. The 'X' pattern seen in FIG. 8 is due to the ability of placing the ILS connecting assembly 2 at the different locations along the x-axis.

TABLE 5

In-Situ Load System Load Points for NTF-113C

| Load Point | $x_{BMC}$, in | $y_{BMC}$, in | $z_{BMC}$, in |
|---|---|---|---|
| 1 | 2.25 | 2.25 | 8.75 |
| 2 | 0.00 | 2.25 | 8.75 |
| 3 | −2.25 | 2.25 | 8.75 |
| 4 | 2.25 | 0.00 | 8.75 |

TABLE 5-continued

In-Situ Load System Load Points for NTF-113C

| Load Point | $x_{BMC}$, in | $y_{BMC}$, in | $z_{BMC}$, in |
|---|---|---|---|
| 5 | 0.00 | 0.00 | 8.75 |
| 6 | −2.25 | 0.00 | 8.75 |
| 7 | 2.25 | −2.25 | 8.75 |
| 8 | 0.00 | −2.25 | 8.75 |
| 9 | −2.25 | −2.25 | 8.75 |

During the calibration process, estimates of uncertainty in load measurements from the force balance are obtained. These estimates of uncertainty include:

errors in setting the applied load due to the hardware used, errors in the mathematical modeling of the balance response, and random errors.

The current approach employed in estimating balance calibration uncertainties utilizes the average residual error from the mathematical model, or mean squared error (MSE). While calculating the MSE is straightforward, using the MSE to quote the uncertainty is misleading and often leads to an underestimate of the true uncertainty. For any given calibration load schedule, it is known that the uncertainty in estimating a load varies throughout the calibration space, whereas the current approach assumes the uncertainty is constant. Furthermore, the current approach only considers the uncertainty from the calibration and excludes the uncertainty that is due to predicting future observations. Prediction intervals are developed as an alternative to the current approach that address the issues previously identified. For a given estimate of a strain-gage bridge response, $\hat{r}F$, at a known load combination, the prediction interval is:

$$\hat{r}F \pm t_{\alpha/2, n-p} \sqrt{\hat{\sigma}^2(1 + F_0'(X'X)^{-1}F_0)} \quad (12)$$

where t is the value obtained from Student's t-distribution with a confidence level of 1−α and n−p degrees of freedom, $\hat{\sigma}^2$, is the estimate of the MSE, $F_0$ is expanded load combination of size [1×p], and F is the expanded model matrix of size [n×p] based on the reduced calibration models. The intervals obtained from Eq. (12) are expressed in terms of the bridge output and therefore the intervals are processed through the balance reduction matrix to obtain intervals in units of forces and moments. The prediction interval provides the bounds on the estimate for a single applied load.

The ILS is used to apply known total loads including the loads due to the tare weight of the device. In addition to precisely determining the mass properties, all critical dimensions that define the moment arms were evaluated using a Mitutoyo model B241 coordinate measuring machine (CMM). A software program was developed that incorporated the precise measurements to calculate the mean loads including tare applied to the test article by the ILS A Monte Carlo simulation was developed to combine all the uncertainties including the tolerance of the CMM based measurements, uncertainty in the mass of the applied and tare weights, and the uncertainty in the accelerometer measurements of the gravity vector. Each source of uncertainty and an estimate of the standard deviation are shown in Table 6. Uncertainty in the forces is primarily a function of the uncertainty in determining the g-vector and relatively constant for the different configurations. Bias in the moments depends on the arms as well and will vary somewhat more.

TABLE 6

Elemental Error Sources for the In-Situ Load System

| Symbol | Description | Standard Deviation | Units |
|---|---|---|---|
| $U_{g_x}$ | Projection of Gravity vector on x-axis | 0.0001 | g's |
| $U_{g_y}$ | Projection of Gravity vector on y-axis | 0.0001 | g's |
| $U_{g_z}$ | Projection of Gravity vector on z-axis | 0.0001 | g's |
| $U_{x_{PID}}, U_{y_{PID}}, U_{z_{PID}}$ | CMM linear Measurements, PID locations | 0.0002 | inches |
| $U_{CG_x}$ | Center of Gravity Measurement on x-axis | 0.0014 | inches |
| $U_{CG_y}$ | Center of Gravity Measurement on y-axis | 0.0025 | inches |
| $U_{CG_z}$ | Center of Gravity Measurement on z-axis | 0.0011 | inches |
| $U_{F_w}$ | Force due to Precision Weights | 0.01% F.S | lbs. |
| | Force due to ILS Components <5 lbs. | 0.00022 | lbs. |
| | Force due to ILS Components >5 lbs. | 0.0022 | lbs. |

The total absolute uncertainty is a combination of the balance uncertainty and the estimated bias in the applied loads and depends on the orientation of the components of the ILS system 1 with respect to the force balance 20. An engineering approximation for the applied load variance is generated using the results from a Monte Carlo simulation and taking the average of the variance in each component for a given configuration. While this is not a strictly mathematical approach, the approximate prediction interval addresses the need for a practical solution. Combining the two components for the final prediction interval is done by converting the uncertainty in the applied load back to an equivalent voltage using the balance primary sensitivities. The prediction interval in Eq. (12) is then adjusted for the bias by adding the additional variance to the MSE.

Trial loads were applied to the NTF-113C balance in the calibration fixture block 48 using the ILS. The loads were computed using standard NASA Langley Research Center (LaRC) practices and prediction intervals were calculated based on the approach described earlier. There were 89 independent load combinations applied over three different days. Table 7 provides a summary of the test results.

TABLE 7

Summary of Confirmation Loading Experiment

| Date | Number of Confirmed Points | Total Number of Points | Total Number of Loadings |
|---|---|---|---|
| Jul. 11, 2013 | 165 | 168 | 28 |
| Jul. 12, 2013 | 232 | 240 | 40 |
| Jul. 15, 2013 | 117 | 126 | 21 |
| Total | 514 | 534 | 89 |

Capture Probability 96.3%

TABLE 8

Example In-Situ Load System Confirmation Point with Prediction Interval

| Component | Applied Load, lbs or in-lbs | Estimated Load, lbs or in-lbs | 95% PI Low, lbs or in-lbs | 95% PI High, lbs or in-lbs |
|---|---|---|---|---|
| $F_x$ | 143.22 | 144.18 | 142.85 | 145.50 |
| $F_y$ | 3.87 | 2.81 | 0.59 | 5.04 |
| $F_z$ | 2496.70 | 2495.90 | 2492.90 | 2499.00 |
| $M_x$ | −41.80 | −45.95 | −65.82 | −26.08 |
| $M_y$ | 4368.60 | 4368.50 | 4348.90 | 4388.10 |
| $M_z$ | −4.64 | −3.54 | −13.57 | 6.48 |

The invention claimed is:

1. An on-site method of calibrating a force balance in the presence of a gravitational field defining a gravity vector, the method comprising:
    providing a force balance defining a force balance coordinate system, wherein the force balance is configured to measure applied roll, pitch, and yaw moments and axial, side, and normal forces;
    connecting the force balance to a movable support that is capable of rotating the force balance in at least pitch and roll;
    utilizing an angle measurement system to measure an angular orientation of the force balance relative to the gravity vector;
    providing a pivotable connecting assembly having an upper mounting structure that is operably connected to the force balance such that forces applied to the upper mounting structure are transmitted to the force balance wherein the upper mounting structure is pivotably connected to a lower mounting structure by bearings that permit rotation of the lower mounting structure relative to the upper mounting structure in at least pitch and roll; wherein:
        the upper mounting structure includes a base portion and a pair of spaced apart support structures extending from the base portion;
        the lower mounting structure includes a base portion and a pair of spaced apart support structures extending from the base portion; and
        the pivotable connecting structure further including a bearing cross that is rotatably connected to the support structures of the upper mounting structure by first and second ball bearings, and wherein the bearing cross is rotatably connected to the support structures of the lower mounting structure by third and fourth ball bearings;
    operably connecting a test weight to the lower mounting structure to thereby apply a known test force to the force balance;
    comparing force measurements of the force balance to a test force applied to the force balance at a first angular orientation of the force balance relative to the gravity vector;
    rotating the force balance to a second angular orientation relative to the gravity vector;
    comparing force measurements of the force balance to a test force applied to the force balance at the second angular position relative to the gravity vector
    generating calibration factors by comparing the first and second force measurements to the known test force to determine differences between the first and second force measurements and the known test force whereby the calibration factors can be utilized to measure applied loads during aerodynamic testing in a wind tunnel.

2. The method of claim 1, including:
    providing an aerodynamic model to be tested in a wind tunnel;
    connecting the upper mounting structure to the aerodynamic model to the force balance such that test forces applied to the pivotable connecting assembly are transmitted through the force balance.

3. The method of claim 2, wherein:
    the movable support is located in a wind tunnel;
    the test forces are applied to the aerodynamic model in a wind tunnel.

4. The method of claim 1, including:
    providing an angle measurement system comprising three accelerometers that are configured to measure the angular orientation of the angle measurement system relative to the gravity vector.

5. The method of claim 4, including:
    rigidly connecting the angle measurement system to the upper mounting structure.

6. The method of claim 1, wherein:
    the movable support is positioned in a wind tunnel.

7. A method of calibrating a force balance in a wind tunnel, the method comprising:
    connecting a force balance to a movable support member in a wind tunnel;
    utilizing a pivoting connecting assembly having at least two rotational degrees of freedom to connect a test weight to the force balance to thereby apply a known test force to the force balance wherein the pivoting connecting assembly includes upper and lower mounting structures that are pivotably interconnected by a bearing cross and a plurality of bearings to provide at least two degrees of freedom of the lower mounting structure relative to the upper mounting structure;
    obtaining a first force measurement from the force balance when a known test force is applied to the force balance when the force balance is in a first orientation;
    obtaining a second force measurement from the force balance when a known test force is applied to the force balance when the force balance is in a second orientation wherein the force balance is rotated relative to the first orientation; and
    generating calibration factors by comparing the first and second force measurements to the known test force to determine differences between the first and second force measurements and the known test force whereby the calibration factors can be utilized to measure applied loads during aerodynamic testing in a wind tunnel.

8. The method of claim 7, wherein:
    the method is conducted in a gravitational field defining a unitary gravity vector,
    the known test force defines a load vector having a magnitude and a direction that coincides with a direction of the unitary gravity vector.

9. The method of claim 8, wherein:
    the force balance defines a balance coordinate system at a balance moment center point;
    the load vector is applied at a load point that is spaced apart from the balance moment center point to define a distance vector extending between the balance moment center point and the load point; and
    the test weight generates applied moments about the balance moment center whereby the applied moments define an applied moment vector that is equal to the vector produce of the distance vector and the load vector.

10. The method of claim 9, wherein:
    the load vector can be expressed in the balance coordinate system as the product of the magnitude of the load vector and the gravity vector.

11. The method of claim 10, wherein:
    the wind tunnel defines a generally horizontal primary axis and generates flow in a first direction that is parallel to the primary axis;
    the balance coordinate system defines a y axis that can be positioned parallel to the primary axis to measure axial forces on an aerodynamic model in the wind tunnel; and
    the y axis is not parallel to the primary axis in at least one of the first and second orientations such that the load vector component includes a component that is parallel to the y axis whereby the force balance can be calibrated for measuring axial forces acting parallel to the y axis.

12. The method of claim 7, including:
measuring an orientation of the force balance when the force balance is in the first and second orientations.

13. The method of claim 12, including:
providing an angle measuring system that utilizes gravitational forces to measure an orientation of the force balance.

14. The method of claim 7, including:
connecting an aerodynamic model to the force balance;
connecting the pivoting connecting assembly to the aerodynamic model.

15. The method of claim 7, including:
connecting a calibration fixture to the force balance;
connecting the pivoting connecting assembly to the calibration fixture.

16. A system for calibrating a force balance in the presence of a gravitational field defining a gravity vector, the system comprising:
a force balance configured to measure loads including axial force, normal force, side force, pitching moment, rolling moment and yawing moment in a coordinate system defined by the force balance;
a test structure connected to the force balance such that loads applied to the test structure can be measured by the force balance;
a load bearing assembly including an upper mounting structure secured to the test structure and a lower mounting structure that is pivotably connected to the upper mounting structure and pivots relative to the upper mounting structure in at least pitch and roll, wherein the lower mounting structure includes a connector configured to support a test weight to thereby apply a known force to the force balance in the direction of the gravity vector and wherein the pivoting connecting assembly includes upper and lower mounting structures that are pivotably interconnected by a bearing cross and a plurality of bearings to provide at least two degrees of freedom of the lower mounting structure relative to the upper mounting structure; and
an angle measurement system that provides gravitation vector components in the coordinate system of the force balance, whereby at least one of the measured loads can be compared to a known applied load.

17. The system of claim 16, wherein:
the test structure comprises an aerodynamic model.

18. The system of claim 16, wherein:
The test structure comprises a calibration fixture.

* * * * *